(12) United States Patent
Kunter et al.

(10) Patent No.: US 9,242,849 B2
(45) Date of Patent: Jan. 26, 2016

(54) FILLING NOZZLE

(71) Applicant: Elaflex Hiby Tanktechnik GmbH & Co. KG, Hamburg (DE)

(72) Inventors: Stefan Kunter, Hamburg (DE); Ulrich Meyer, Hamburg (DE)

(73) Assignee: Elaflex Hiby Tanktechnik GmbH & Co. KG, Hamburg (DE)

( * ) Notice: Subject to any disclaimer, the term of this patent is extended or adjusted under 35 U.S.C. 154(b) by 87 days.

(21) Appl. No.: 14/078,201

(22) Filed: Nov. 12, 2013

(65) Prior Publication Data

US 2014/0130939 A1    May 15, 2014

(30) Foreign Application Priority Data

Nov. 14, 2012  (EP) ................................... 12192496

(51) Int. Cl.
| | | |
|---|---|---|
| *B65B 1/30* | (2006.01) | |
| *B67D 7/48* | (2010.01) | |
| *B67D 7/50* | (2010.01) | |
| *B67C 3/26* | (2006.01) | |
| *B67D 7/02* | (2010.01) | |
| *B67D 7/34* | (2010.01) | |
| *B67D 7/54* | (2010.01) | |

(52) U.S. Cl.
CPC . *B67D 7/48* (2013.01); *B67C 3/264* (2013.01); *B67D 7/02* (2013.01); *B67D 7/34* (2013.01); *B67D 7/50* (2013.01); *B67D 2007/545* (2013.01)

(58) Field of Classification Search
CPC ...... B67D 7/48; B67D 7/50; B67D 2007/545; B67C 3/2637; B67C 3/264

USPC .................................. 141/206, 351, 353, 354
See application file for complete search history.

(56) References Cited

U.S. PATENT DOCUMENTS 3,288,179 A * 11/1966 Romanowski ................ 141/225
5,562,133 A   10/1996 Mitchell et al.
6,374,868 B1   4/2002 Channing et al.

FOREIGN PATENT DOCUMENTS

| DE | 202011002664 U1 | 4/2011 |
| DE | 202010016319 U1 | 3/2012 |
| EP | 2186773 A1 | 5/2010 |

(Continued)

OTHER PUBLICATIONS

English Abstract of DE 202010016319, published Mar. 19, 2012.
English Abstract of DE 202011002664, machine-translation.

(Continued)

*Primary Examiner* — Jason K Niesz
(74) *Attorney, Agent, or Firm* — Casimir Jones, S.C.; Mary Ann Brow

(57) ABSTRACT

The invention relates to a filling nozzle for dispensing a liquid into a tank of a motor vehicle, having a main valve (5). It is provided according to the invention that a safety valve (7) is arranged downstream of the main valve (5), which safety valve can be moved from a closed position into an open position by means of an opening movement directed in an upstream direction, and that a safety device (11) is provided which has an operative connection to the safety valve (7) and which is designed to detect the insertion of the filling nozzle into a tank provided for the corresponding liquid and which effects a movement of the safety valve from the closed position into the open position when an insertion of the filling nozzle into a tank provided for the corresponding liquid is detected.

13 Claims, 7 Drawing Sheets

(56) References Cited

FOREIGN PATENT DOCUMENTS

| | | | |
|---|---|---|---|
| EP | 2386520 | A1 | 11/2011 |
| GB | 2443427 | A | 5/2008 |

OTHER PUBLICATIONS

English Abstract of EP 2386520, machine-translation.
European Search Report, mailed Feb. 27, 2013, for European Patent Application No. 12192496.3, 6 pages.

* cited by examiner

FILLING NOZZLE

This application is claims the benefit of European Application No. 12 192 496.3, filed Nov. 14, 2013, which is incorporated herein by reference in its entirety.

The invention relates to a filling nozzle for dispensing a liquid into a tank of a motor vehicle, having a main valve.

Filling nozzles for the refuelling of motor vehicles are known for example from EP 2 186 773 A1. Likewise known are filling nozzles with a misfilling inhibitor which is intended to ensure that dispensing of liquid takes place only after said filling nozzle has been inserted into a tank provided specifically for said liquid. In simple cases, such a misfilling inhibitor may merely comprise different diameters of the filling nozzle outlet pipe and of the filler neck of the associated tank, as is known for example in the case of filling nozzles for gasoline and diesel fuels.

As exhaust-gas standards become ever more stringent, some motor vehicles require auxiliary liquids which are intended to ensure low-emission combustion and thus reduce exhaust gas emissions. A known example here is in particular a 32.5% urea solution (known under the trade name AdBlue) which serves for reducing the nitrogen oxide emissions of diesel engines.

Urea solution is already widely used as an auxiliary liquid in the heavy goods vehicle sector, but in future will also be used in diesel passenger motor vehicles. The significance of a misfilling inhibitor will thus increase if passenger motor vehicles, too, are to have two tanks, one for diesel fuel and one for an auxiliary liquid such as urea solution.

It is therefore the object of the invention to provide a filling nozzle of the type mentioned in the introduction, which filling nozzle provides the possibility of improved safety against misfilling and can be implemented without problems in the filling station environment.

The invention achieves said object in that a safety valve is arranged downstream of the main valve, which safety valve can be moved from a closed position into an open position by means of an opening movement directed in an upstream direction, and in that a safety device is provided which has an operative connection to the safety valve and which is designed to detect the insertion of the filling nozzle into a tank provided for the corresponding liquid and which effects a movement of the safety valve from the closed position into the open position when an insertion of the filling nozzle into a tank provided for the corresponding liquid is detected.

Some expressions used within the context of the invention will firstly be explained.

A filling nozzle is a device for controlling the liquid flow during a tank filling process. The demands on the construction and mode of operation of automatic filling nozzles for use on filling pumps are governed by DIN EN 13012 Doc. 2001. Expressions defined in said standard are also used in the present application.

The feature "for dispensing a liquid into a tank of a motor vehicle" expresses the suitability of the filling nozzle for such a tank filling process.

The user controls the output of liquid by means of the main valve. An actuating lever (also referred to as switching lever) is generally used to actuate the main valve. The outlet pipe is the device through which the liquid is conducted into the vessel to be filled.

An additional safety valve is arranged downstream, that is to say in the intended flow direction of the liquid from the main valve to the outlet pipe. Said safety valve can be moved from a closed position, in which it blocks the liquid flow even when the main valve is open, into an open position by means of an opening movement directed upstream. This means that said safety valve must be opened counter to the flow direction of the outflowing liquid, and if appropriate counter to a pressure built up by said liquid. A further element of the filling nozzle according to the invention is a safety device which is designed to detect the insertion of the filling nozzle into a tank provided for the corresponding liquid.

The safety device is preferably designed to interact with a filler neck of a tank provided for the corresponding liquid. Said safety device is preferably moved from the blocking position into the enable position automatically by the insertion of the filling nozzle into the tank filler neck designed for the same. After the filling nozzle is inserted into the corresponding tank filler neck, the tank filling process can thus be commenced by actuating the actuating lever.

The safety device may for example be provided for interacting with the structural/mechanical configuration of a corresponding tank filler neck. Urea tanks in motor vehicles generally have a tank filler neck which tightly surrounds the outlet pipe of the associated filling nozzle already in the direct vicinity of the inlet region. The safety device may for example have an element which is arranged in a displaceable manner in the region of the outlet pipe and which is pushed from the blocking position into the enable position by the face-side edge of the tank filler neck, as will be described in more detail further below. Alternatively, the safety device may for example interact magnetically with a magnet arranged in the region of the tank filler neck.

The safety device is operatively connected to the safety valve. When the safety device detects an insertion into a suitable tank, an opening movement of the safety valve is effected by way of said operative connection. The safety valve thus moves, with an upstream direction component, from the closed position into the open position. Misfilling is prevented in this way.

The safety device may be designed as a detector, the safety valve may have a corresponding actuator, and the operative connection may for example be realized electrically.

Within the context of the invention, however, it is particularly preferable for the operative connection between the safety device and safety valve to be realized without external energy. External energy is any form of energy which is supplied specifically for the operation of the safety device or which is extracted from an energy source arranged in the filling nozzle. The expression external energy encompasses in particular electrical energy, and thus the filling nozzle according to the invention operates without electrical energy and therefore does not require an external electrical energy supply or an internal electrical energy source, for example a battery. The expression "operative connection between the safety device and safety valve" denotes, in functional terms, the actuation/manipulation of the safety valve by the safety device such that no opening of the safety valve takes place when the safety device is in the blocking position.

The design of the safety device according to the invention, and the operative connection thereof to the safety valve without external energy, in particular electrical energy, permits the use of the filling nozzle according to the invention in the direct vicinity of other filling nozzles which dispense fuel, and which must therefore satisfy particularly high demands with regard to explosion prevention. For example, the invention makes it possible for a filling nozzle for dispensing urea solution to be arranged in the direct vicinity of diesel or gasoline filling nozzles, for example on the same filling pump.

By contrast, filling nozzles known from the prior art which are used for urea solution and which have a corresponding safety device for preventing against misfilling require electrical energy for sensors which are intended to detect the insertion of the filling nozzle into a special so-called AdBlue tank and thus prevent misfilling. Said known filling nozzles must therefore be arranged remote from fuel filling pumps in order to satisfy the explosion prevention requirements. This makes a tank filling process for both diesel and also urea solution very much more cumbersome owing to the additional maneuvering process that is required. For heavy goods vehicles used in the commercial sector, this may be acceptable, but in the passenger motor vehicle sector, such a dual tank filling process, with the vehicle having to be moved in between, would be unacceptable. The invention makes it possible for filling nozzles for urea solution to be combined with those for diesel fuel in close proximity, for example on a single filling pump.

According to the invention, the operative connection between the safety device and safety valve is preferably realized magnetically. For example, the safety device may have an element which can be displaced by the insertion of the outlet pipe of the filling valve into a tank provided for the same, and which has a magnet, the displacement of which effects an opening movement of said safety valve owing to interaction with a magnet arranged on the safety valve, for example on the valve shank thereof. Alternatively, a corresponding magnet may be arranged in the region of the tank filler neck, which magnet interacts with the magnet of the valve shank. The insertion of the filling nozzle into the tank takes place with the main valve closed, and thus the region of the filling nozzle downstream of the main valve is unpressurized, such that, before the opening of the main valve, the opening movement of the safety valve can be effected by means of even relatively low magnet forces because said opening movement does not need to take place counter to the back pressure of liquid present upstream of the safety valve.

The safety valve is preferably arranged in the region of the outlet pipe, and the valve seat may be arranged in the region of the outlet end of the outlet pipe. The valve and valve shank are preferably designed such that the safety valve is preloaded into the closed position by liquid pressure in the outlet pipe. In this way, the sealing action of the safety valve is intensified if, owing to incorrect operation, the main valve is opened before the safety valve has detected an insertion into a suitable tank filler neck and thereby opened the safety valve. Misfilling is thus reliably prevented even in the case of incorrect operation.

In a preferred embodiment of the invention, a sliding sleeve which is displaceable axially relative to the outlet pipe may be arranged in the region of the outlet, which sliding sleeve has arranged thereon or connected thereto an operative magnet that interacts with the magnetically actuable safety valve. Here, the expression "operative magnet" refers merely to the fact that the magnet is designed for corresponding interaction with, and thus operative connection to, the safety valve. According to the invention, an operative magnet of said type may also be arranged on or in the region of the safety valve. It is possible for one or more magnets to be provided either exclusively on the safety valve or exclusively in the region of said sliding sleeve, which magnet or magnets interact(s) with a magnetizable material of the corresponding counterpart element (sliding sleeve or safety valve), such as for example iron or iron alloys. It is however preferable if corresponding magnets are arranged both on the sliding sleeve and also the safety valve. Where reference is made, within the context of the invention, to magnets or a magnetic interaction, permanent magnets are preferable.

It may be possible for the sliding sleeve to be automatically displaced from a blocking position into an enable position by the insertion of the filling nozzle into a tank filler neck designed for the same. Said displacement of the sliding sleeve then effects a magnetic opening of the safety valve, such that, after the insertion into the correspondingly designed tank filler neck, the main valve of the filling nozzle can be opened by means of the actuating lever, and the tank filling process can be commenced.

The filling valve according to the invention may additionally have a gas extraction device, such as is basically known from the prior art. Since ammonia can be formed as a result of the breakdown of urea, such a gas extraction device can contribute to the prevention or reduction of an unpleasant smell during the filling of a tank with urea.

Automatic filling nozzles generally have a safety shut-off means which automatically stops the tank filling process when the tank is full. For this purpose, the outlet pipe has a so-called sensor line which communicates pneumatically with a triggering device, arranged in the region of the main valve, for said main valve. The details of the design of a safety shut-off means of said type are well known to a person skilled in the art and are disclosed for example in EP 2 386 520 A1. If, during the course of a tank filling process, the liquid level reaches the end of the outlet pipe and thus the inlet of the sensor line, the pressure conditions in the sensor line change and lead to a triggering, and thus a closure, of the main valve. According to the invention, it is advantageous if a safety shut-off means of said type is additionally designed to close the main valve if the back pressure between the main valve and safety valve rises above a predetermined threshold value. If the main valve is opened by means of the actuating lever when the safety valve is still closed, the pressure in the outlet pipe upstream of the safety valve rises up to the operating pressure that prevails upstream of the main valve, said operating pressure being produced by the pump of the filling pump. The result is an increased pressure difference between the pressure in the outlet pipe, on the one hand, and in the sensor line of the safety shut-off means, on the other hand (details with regard to these expressions can be found in EP 2 386 520 A1), and said increased pressure difference leads to a triggering of the safety shut-off means and thus a decoupling of the main valve from the actuating lever; the main valve can then be moved into the closed position again by the closing spring. Said additional safety measure prevents a situation in which, in the event of incorrect operation (the actuating lever being pulled when the filling nozzle is not correctly inserted), the entire operating pressure prevailing at the filling nozzle must initially be held back by the safety valve alone, and dissipated via the sensor line with a time delay.

The 32.5% aqueous urea solution, used as AdBlue, is a highly concentrated salt solution. If drips fall from a filling nozzle for urea solution during the handling thereof, conspicuous salt marks form after the solvent, water, evaporates. The safety valve according to the invention can additionally perform the function of a drip prevention valve in the region of the outlet end. It prevents residual amounts of liquid still present in the outlet pipe from dripping out when the safety valve is closed.

The invention thus also relates to a filling nozzle according to the invention which is designed for dispensing urea solution.

The invention also relates to a filling pump for the combined dispensing of fuels and urea solution, which filling pump has at least one filling nozzle for dispensing fuel (in particular diesel fuel). According to the invention, said filling pump also has at least one filling nozzle according to the invention for dispensing urea solution. Such a filling pump permits a convenient simultaneous or directly successive tank filling process with fuel, in particular diesel fuel, and urea solution. Maneuvering of the vehicle in between is not necessary. The configuration of the filling nozzle according to the invention for dispensing urea solution without the supply of external energy, in particular electrical energy, allows it to be used in the direct vicinity of a filling pump for dispensing fuels.

An exemplary embodiment of the invention will be described below on the basis of the drawing, in which.

Figure 1:
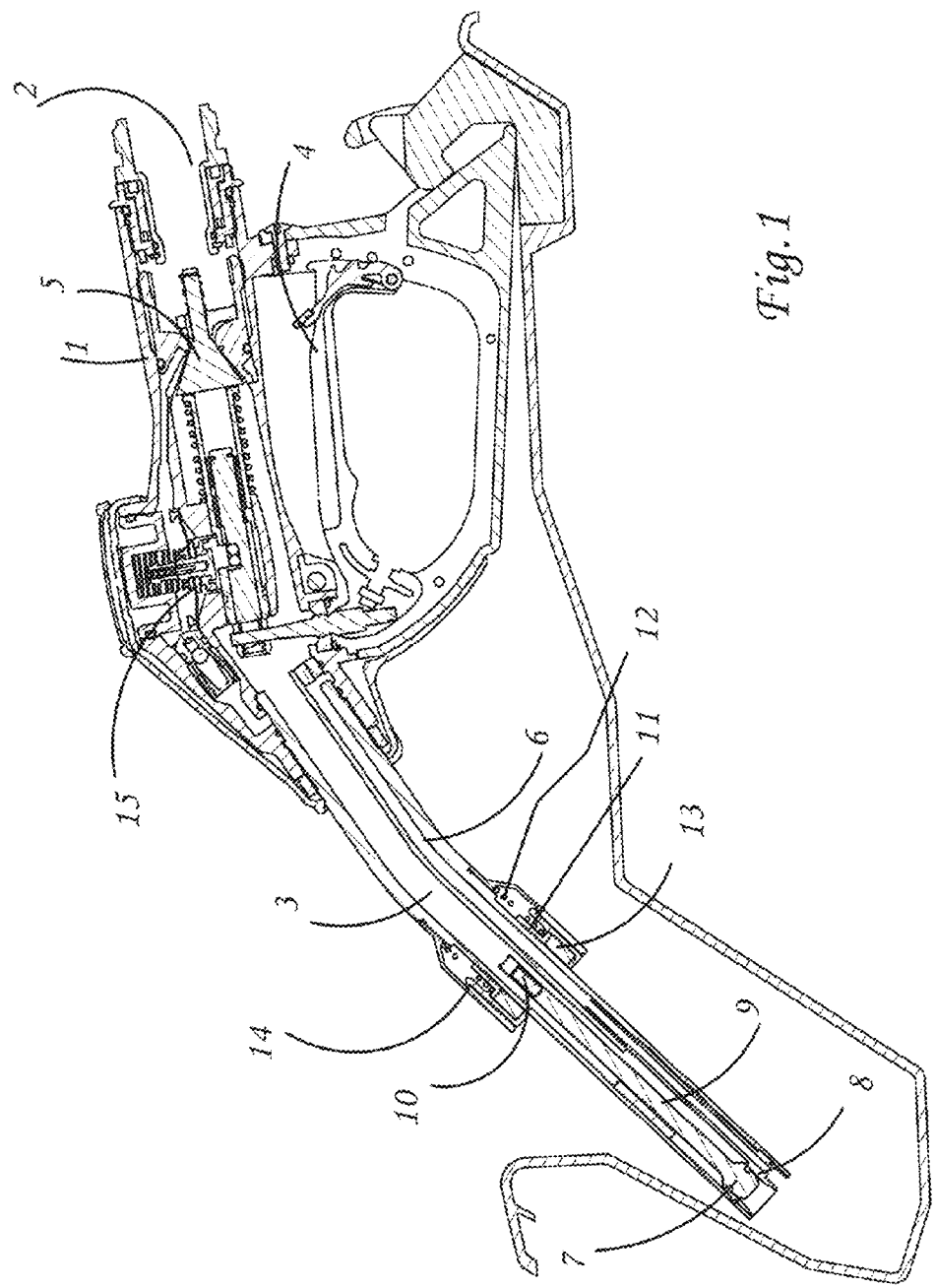
FIG. 1 shows a section through a filling nozzle according to the invention.

A filling nozzle (also referred to colloquially as "pistol-grip nozzle") according to the invention has a valve housing 1, an inlet 2, connected to a hose (not illustrated), for liquid, an outlet pipe 3 and a switching lever 4. In a known manner described for example in EP 2 386 520 A1, the switching lever 4 actuates the main valve 5 of the filling nozzle. A sensor line 6 communicates pneumatically with the surroundings of the outlet end of the outlet pipe 3, and can thus, in a conventional manner as described in the cited EP document, effect a complete shut-off of the tank.

In the region of the outlet end of the outlet pipe 3 there is provided a safety valve 7 which, downstream, closes against a valve seat 8. The upstream end of the valve shank 9 is provided with a magnet 10.

A sliding sleeve 11 is arranged around the outer circumference of the outlet pipe 3 in the region of the outlet end. The sliding sleeve 11 is preloaded by a compression spring 12 into the blocking position illustrated in FIG. 1, in which said sliding sleeve is situated in an axial end position in the direction of the outlet end of the outlet pipe 3. An annular operative magnet 13 is arranged on the sliding sleeve 11. The sliding sleeve 11 is received in a displaceable manner in a cylindrical pocket 14 which concentrically surrounds the outer circumference of said sliding sleeve, which pocket also receives the compression spring 12.

In the position shown in FIG. 1, the safety valve is preloaded into the closed position by the magnetic interaction between the operative magnet 13 and magnet 10.

In the operating state illustrated in FIG. 1 with the safety valve 7 closed, if the actuating lever 4 is pulled, the main valve 5 firstly opens and allows liquid to flow into the outlet pipe 3. The pressure therein rises because the safety valve 7 does not allow said liquid to flow out of the outlet pipe 3. If the pressure rises above a defined threshold value, a differential pressure is generated across the means, indicated at 15, for completely shutting off the tank, or across the diaphragm of said means, such that said differential pressure triggers the means for completely shutting off the tank and decouples the actuating lever 4 from the main valve 5 in a known way, such that the main valve 5 is closed again by its closing spring. The threshold value for the pressure at which such triggering takes place lies above the pressure that prevails in the outlet pipe 3 during a conventional tank filling process, and below the operating pressure (provided by the pump of the filling pump) at the inlet 2 of the filling nozzle.

Figure 2:
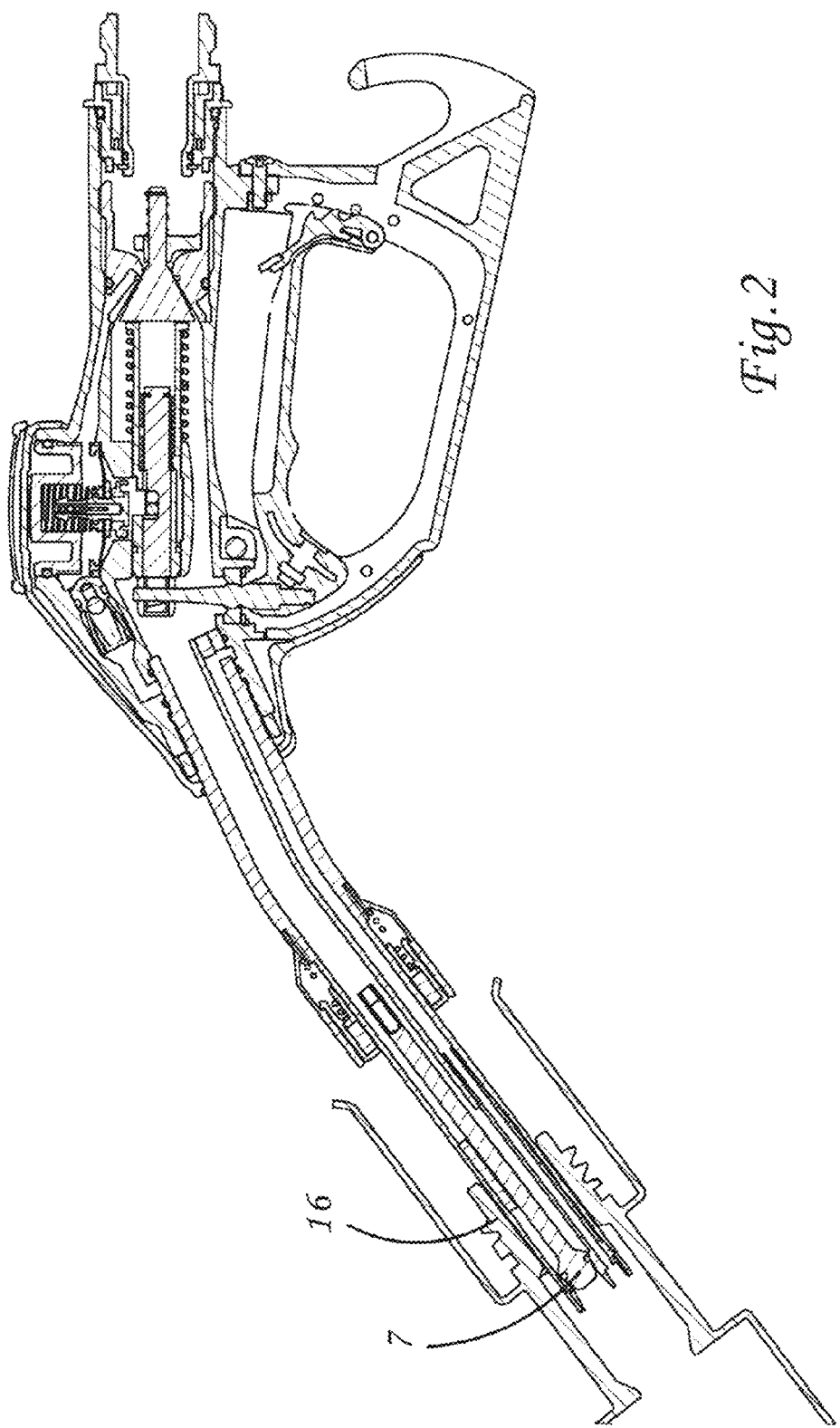
FIG. 2 shows a state in which the filling nozzle according to the invention is partially inserted into the tank filler neck of an associated urea tank.

FIG. 2 shows a state in which the filling nozzle according to the invention is partially inserted into the tank filler neck of an associated urea tank. The safety valve 7 is, as before, closed.

Figure 3:
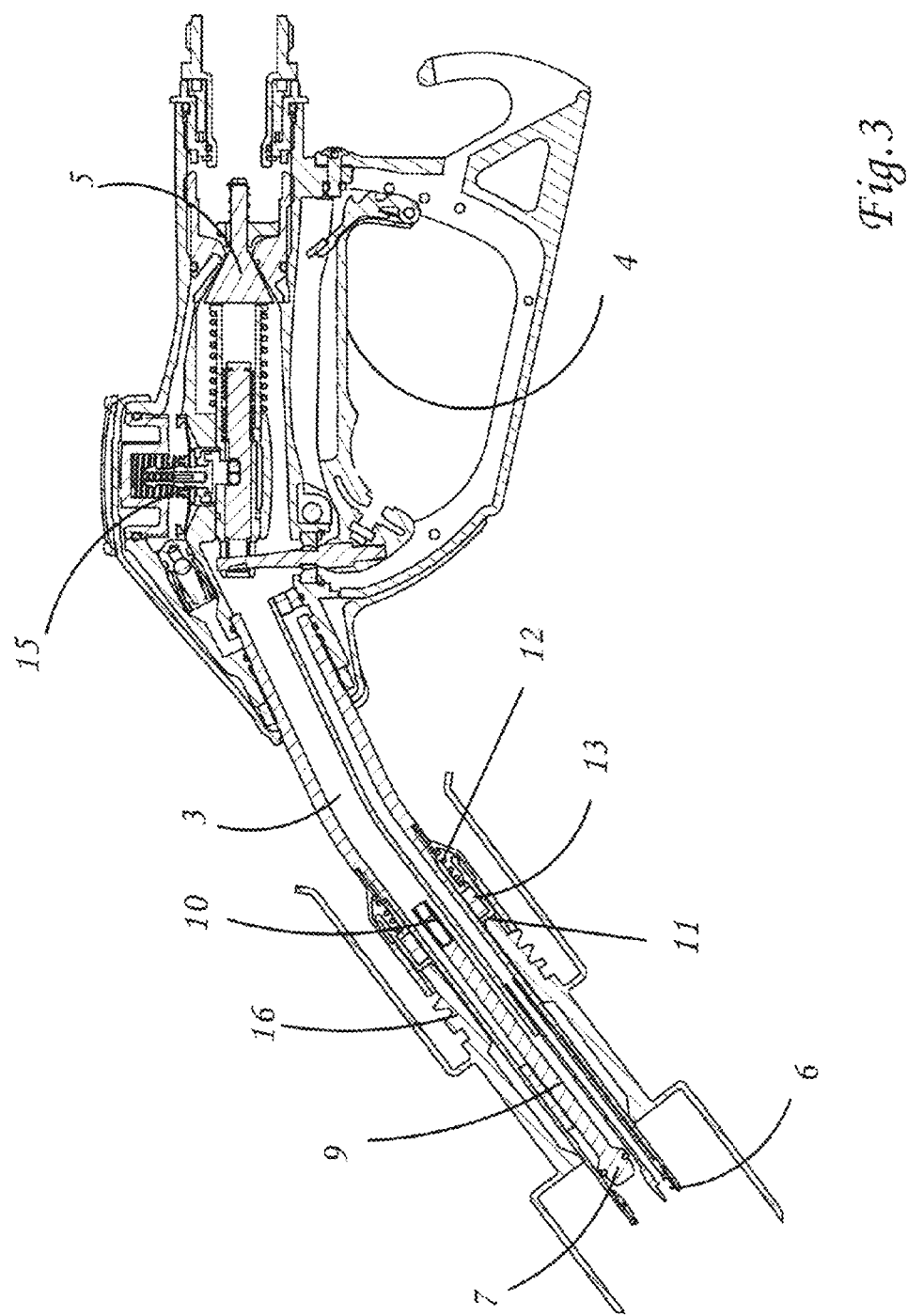
FIG. 3 shows a state in which the filling nozzle according to the invention is fully inserted into the tank filler neck of an associated urea tank.

In FIG. 3, the outlet end of the outlet pipe 3 is fully inserted into the tank neck 16 of a urea tank of a passenger motor vehicle. Said tank neck is designed so as to tightly surround the outlet pipe already in the direct vicinity of the start of the filler neck, as illustrated in FIG. 3. The annular face surface of the sliding sleeve 11 abuts against the corresponding counterpart surface of the tank filler neck 16, and the sliding sleeve 11 is displaced from the blocking position illustrated in FIGS. 1 and 2 into the enable position illustrated in FIG. 3, counter to the pressure of the spring 12. In said enable position, the upstream end of the sliding sleeve 11 abuts against a stop. The operative magnet 13 is correspondingly also displaced axially together with the sliding sleeve 11. Owing to the magnetic operative connection between the operative magnet 13 and the magnet 10 on the valve shank 9, the safety valve 7 is moved into the open position illustrated in FIG. 3. Said opening movement takes place in the upstream direction. The tank filling process can be commenced by virtue of the switching lever 4 being pulled and the main valve 5 thereby being opened. The outflow of liquid through the outlet pipe 3 is such that the safety valve 7 remains in its open position and the tank filling process can be performed.

The tank filling process can be ended in the conventional way by releasing or unlocking the actuating lever 4. If the tank has been substantially filled, the end of the outlet pipe 3, and thus also the sensor line 6, are immersed in liquid. The pressure difference that is thus effected pneumatically effects a shut-off of the main valve, and thus a termination of the tank filling process, in a conventional manner described for example in EP 2 386 520 A1.

The tank filling process is likewise ended if the filling nozzle is pulled out of the tank filler neck 16 and the sliding sleeve 11 is pushed from the enable position in FIG. 3 back into the blocking position of FIG. 1 or 2 by means of the spring 12. Owing to the magnetic interaction between the annular magnet 13 (operative magnet 13) and the magnet 10, the safety valve 7 is moved, in the downstream direction, back into its closed position. If the main valve 5 is now still open, the pressure rise in the outlet pipe 3 results in an above-described triggering of the means 15 for completely shutting off the tank, and thus a closure of the main valve 5.

Gases escaping during the course of the tank filling process can, in a conventional manner, be recirculated by the filling nozzle through a gas extraction duct (not illustrated).

Figure 4:
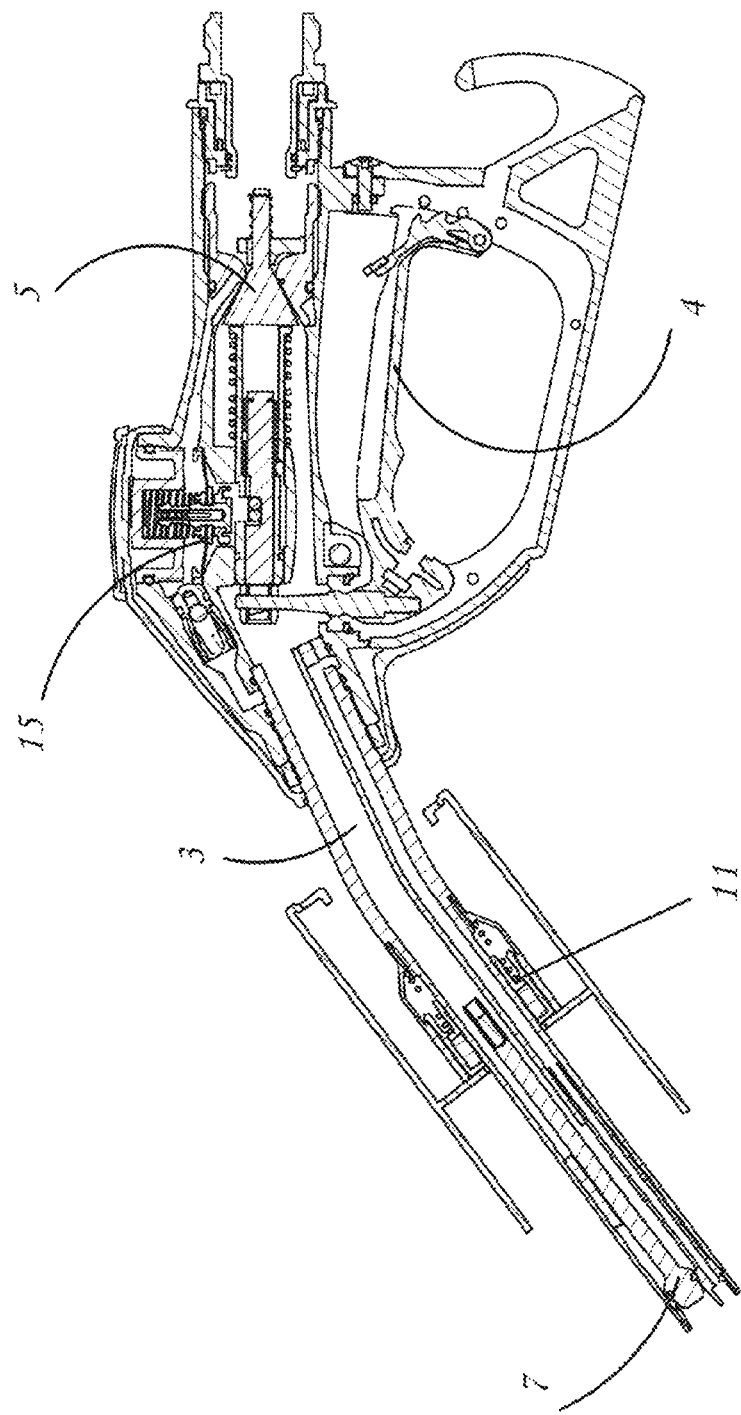
FIG. 4 shows the situation when a filling nozzle according to the invention is inadvertently inserted into a tank filler neck for unleaded gasoline or diesel fuel.

FIG. 4 shows the situation when a filling nozzle according to the invention is inadvertently inserted into a tank filler neck for unleaded gasoline or diesel fuel. The sliding sleeve 11 remains, in any case, in the blocking position, such that no tank filling process can take place. If the actuating lever 4 is nevertheless pulled, the pressure rise in the outlet pipe 3 with the safety valve 7 closed leads to a triggering of the means 15 for completely shutting off the tank, and thus again to a closure of the main valve.

Figure 5:
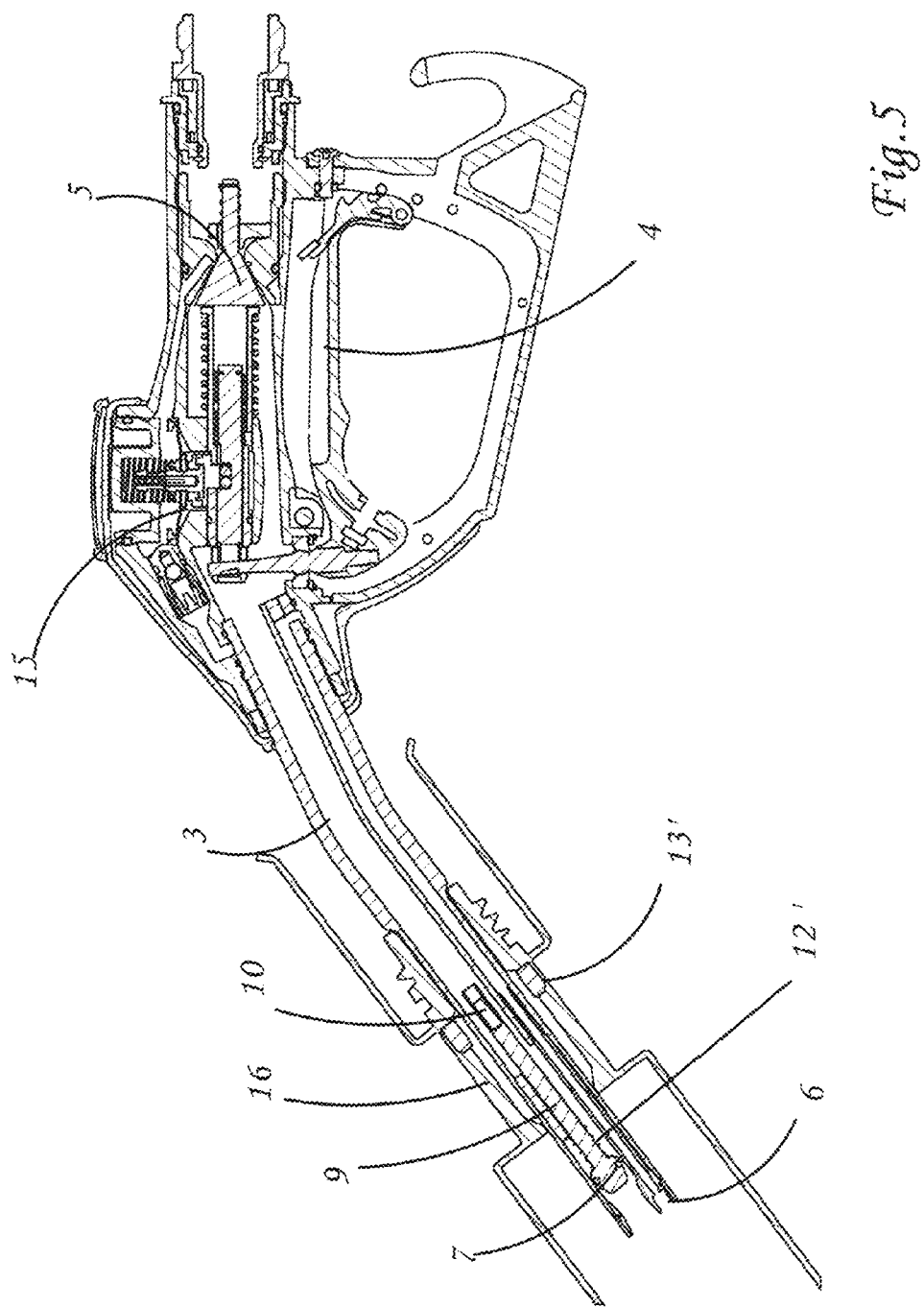
FIG. 5 shows an alternative embodiment of the invention, inserted into a passenger motor vehicle tank filler neck with annular magnet.
Figure 6:
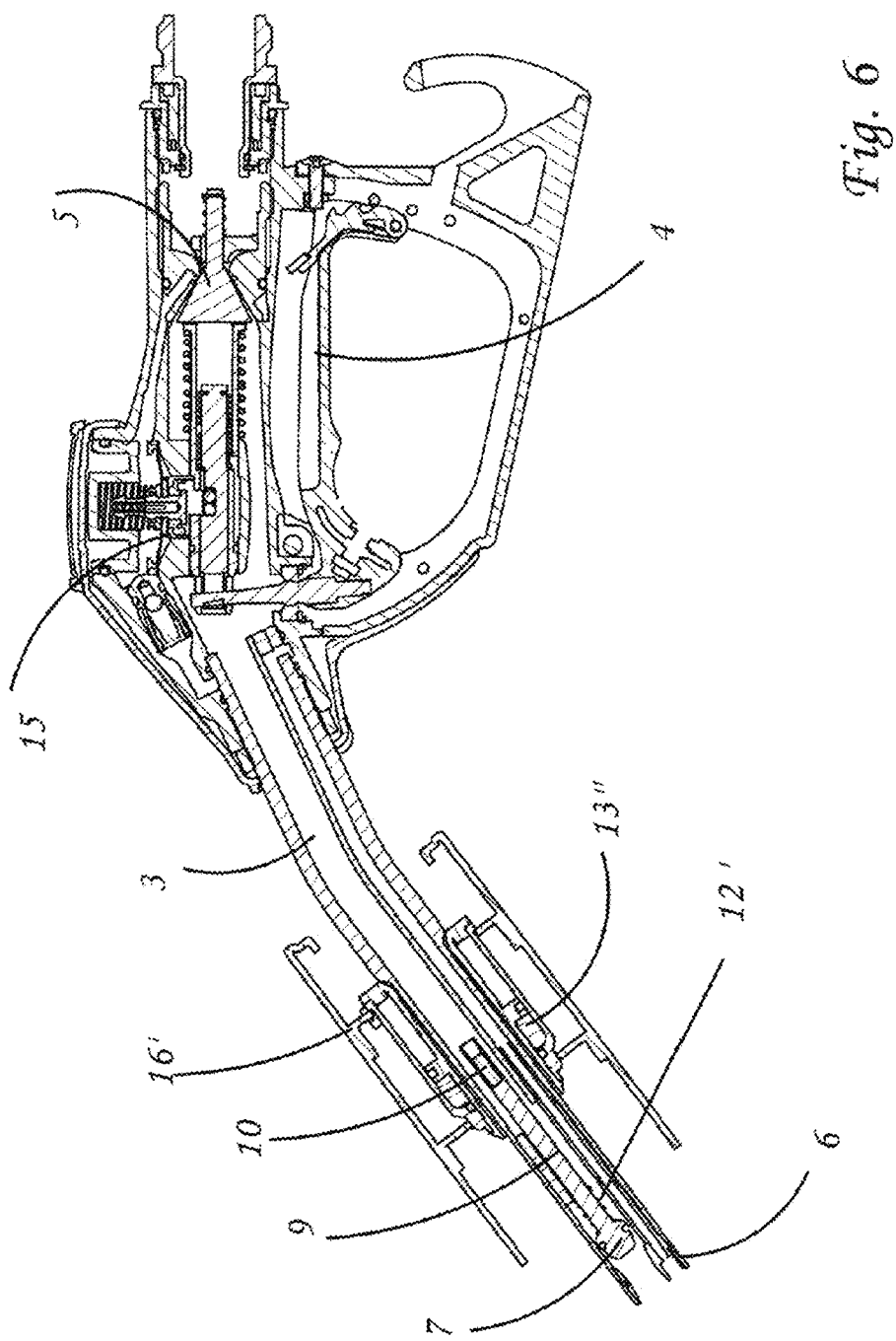
FIG. 6 shows the alternative embodiment of the invention, inserted into a heavy goods vehicle tank filler neck with annular magnet.

FIGS. 5 and 6 show a further embodiment of the invention. The sliding sleeve 11 is omitted in this embodiment. The preloading of the safety valve 7 into the closed position is realized here by means of a closing spring 12' assigned directly to the safety valve 7.

Here, the opening of the safety valve 7 counter to the force of the spring 12' takes place, during the insertion process into a tank filler neck, by interaction of the magnet 10 with an annular magnet arranged in the tank filler neck.

FIG. 5 shows this embodiment of the invention inserted into a passenger motor vehicle filler neck for urea solution, said filler neck having an annular magnet 13'. After the filling nozzle has been fully inserted into the neck, magnetic interaction occurs between the magnet 10 and the magnet 13', such that the safety valve 7 opens and the tank filling process can be commenced.

FIG. 6 shows this embodiment of the invention inserted into a filler neck for urea solution in a heavy goods vehicle, said filler neck being of slightly different construction. Here, too, after the filling nozzle has been fully inserted, the safety valve 7 is opened by interaction of the magnet 10 with an annular magnet 13" arranged in the filler neck.

Figure 7:
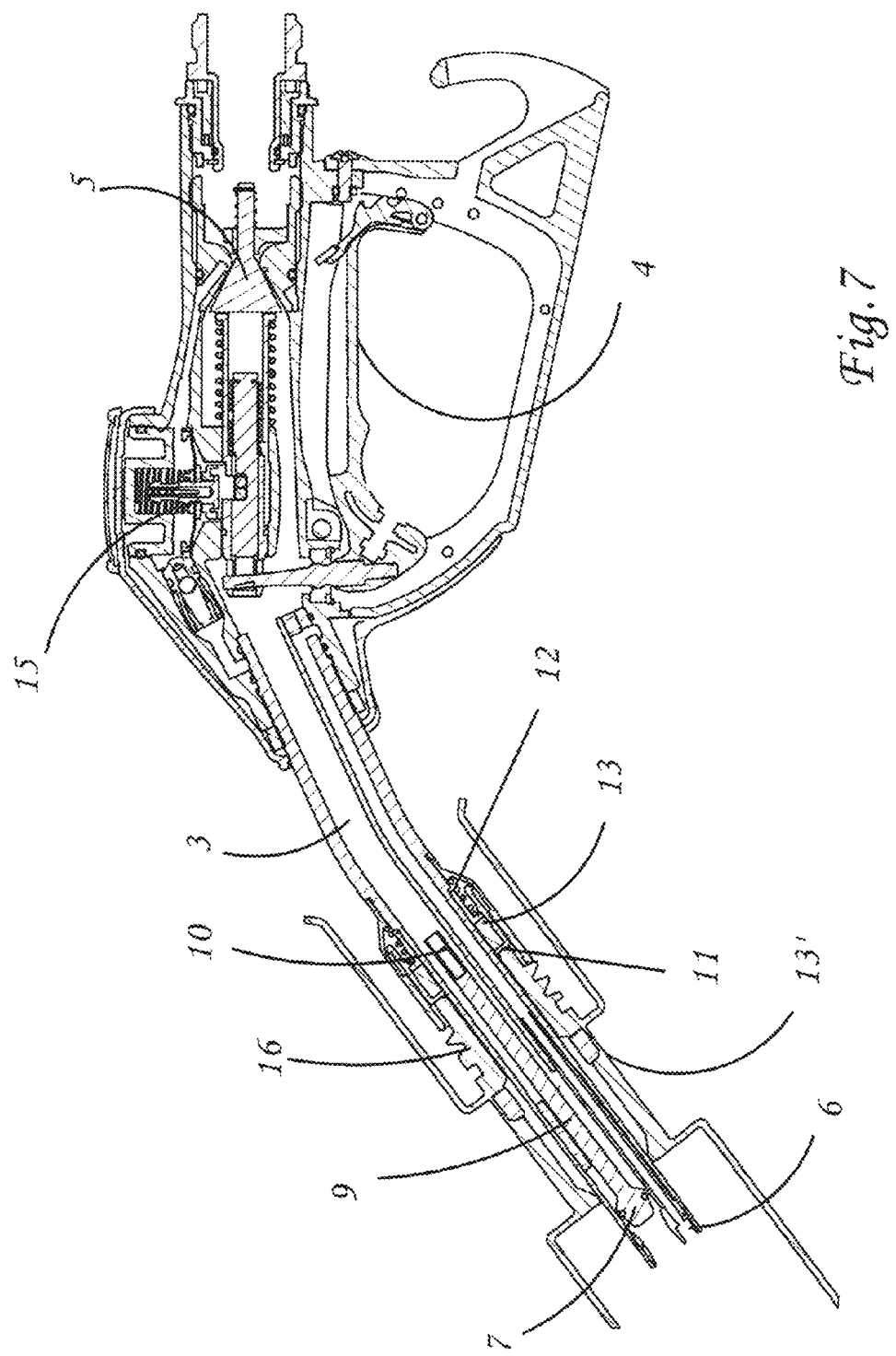
FIG. 7 shows the embodiment of FIGS. 1-4 inserted into a passenger motor vehicle tank filler neck with annular magnet.

FIG. 7 shows the embodiment of FIGS. 1-4 inserted into a filler neck which has an annular magnet 13'. It can be seen that, in this case, the opening of the safety valve 7 is realized in the conventional manner by interaction between the magnet 10 and the magnet 13. The magnet 13' arranged in the filler neck does not have a detrimental effect because it is arranged spatially too far away from the magnet 10.

The invention claimed is:

1. A filling nozzle for dispensing a liquid into a tank of a motor vehicle, having a main valve (5), characterized in that a safety valve (7) is arranged downstream of the main valve (5), which safety valve blocks liquid flow through the filling nozzle when the safety valve is in a closed position, and which safety valve can be moved from the closed position into an open position by means of an opening movement directed in an upstream direction, and in that a safety device (11) is provided which has an operative connection to the safety valve (7) and which is designed to detect the insertion of the filling nozzle into a tank provided for the corresponding liquid and which effects a movement of the safety valve from the closed position into the open position when an insertion of the filling nozzle into a tank provided for the corresponding liquid is detected.

2. The filling nozzle of claim 1, wherein the operative connection between the safety device (11) and safety valve (7) is realized without external energy.

3. The filling nozzle of claim 2, wherein the operative connection between the safety device (11) and safety valve (7) is realized magnetically.

4. The filling nozzle of claim 1, wherein the safety valve (7) is arranged in the region of the outlet pipe (3).

5. The filling nozzle of claim 4, wherein the safety valve (7) has a valve seat (8) in the region of the outlet end of the outlet pipe (3).

6. The filling nozzle of claim 1, wherein the safety valve (7) is preloaded into the closed position by liquid pressure in the outlet pipe (3).

7. The filling nozzle of claim 6, wherein the safety valve (7) is magnetically actuable, and wherein said filling nozzle has an axially displaceable sliding sleeve (11) in the region of the outlet, wherein, on the sliding sleeve, there is arranged an operative magnet (13) that interacts with the safety valve (7).

8. The filling nozzle of claim 7, wherein the safety valve (7) has, arranged on the valve shank, a magnet (10) for interacting with the operative magnet (13).

9. The filling nozzle of claim 7, wherein the sliding sleeve (11) can be displaced from a blocking position into an enable position by the insertion of the filling nozzle into a tank filler neck (16) designed for the same.

10. The filling nozzle of claim 1, wherein said filling nozzle additionally has a gas extraction device.

11. The filling nozzle of claim 1, wherein said filling nozzle has a safety shut-off means which stops the filling process by closing the main valve (5) when a full tank is detected, and in that said safety shut-off means is additionally designed to close the main valve if the back pressure between the main valve (5) and safety valve (7) rises above a predetermined threshold value.

12. The filling nozzle of claim 1, wherein said filling nozzle is designed for dispensing urea solution.

13. A filling pump for the combined dispensing of fuels and urea solution, having at least one filling nozzle for dispensing fuel, wherein said filling pump has at least one filling nozzle according to claim 12 for dispensing urea solution.

\* \* \* \* \*